(12) United States Patent
Ji (10) Patent No.: US 8,888,629 B2
(45) Date of Patent: Nov. 18, 2014

(54) BICYCLE SPROCKET ASSEMBLY WITH CHAIN PROTECTOR

(75) Inventor: Hongfei Ji, Jiangsu (CN)

(73) Assignee: Shimano Inc., Osaka (JP)

( * ) Notice: Subject to any disclaimer, the term of this patent is extended or adjusted under 35 U.S.C. 154(b) by 983 days.

(21) Appl. No.: 11/752,762

(22) Filed: May 23, 2007

(65) Prior Publication Data

US 2008/0289927 A1    Nov. 27, 2008

(51) Int. Cl.
  *B62J 13/00*    (2006.01)
  *F16D 1/00*    (2006.01)
  *F16D 57/02*    (2006.01)
  *B62M 9/128*    (2010.01)

(52) U.S. Cl.
  CPC ............... *B62J 13/00* (2013.01); *B62M 9/128* (2013.01)
  USPC .......................................................... 474/144

(58) Field of Classification Search
  USPC .................. 474/144, 152, 160, 161
  See application file for complete search history.

(56) References Cited

U.S. PATENT DOCUMENTS

| | | | | |
|---|---|---|---|---|
| 504,121 A * | 8/1893 | Cheesman | ..................... | 474/144 |
| 877,820 A * | 1/1908 | Badger | ......................... | 474/144 |
| 1,136,411 A * | 4/1915 | Davis | .............................. | 74/609 |
| 1,567,638 A * | 12/1925 | Dean | .......................... | 301/110.5 |
| 1,643,611 A * | 9/1927 | Rouanet | ......................... | 474/98 |
| 2,610,514 A * | 9/1952 | Long, Jr. | ....................... | 474/183 |
| 3,168,836 A * | 2/1965 | Militana | ......................... | 474/152 |
| 3,170,549 A * | 2/1965 | Baker, III | ................... | 192/217.6 |
| 3,477,303 A * | 11/1969 | Brilando | ...................... | 474/144 |
| 3,494,227 A * | 2/1970 | Shimano et al. | ............... | 475/259 |
| 3,815,439 A * | 6/1974 | Tarutani | ......................... | 474/144 |
| 3,835,729 A * | 9/1974 | Tarutani | ......................... | 474/144 |
| 4,044,621 A * | 8/1977 | McGregor et al. | ............ | 474/144 |
| 4,116,319 A * | 9/1978 | Nagano et al. | .................. | 192/64 |
| 4,144,773 A * | 3/1979 | Addicks | ......................... | 474/161 |
| 4,145,095 A * | 3/1979 | Segawa | ......................... | 384/545 |
| 4,226,317 A * | 10/1980 | Nagano et al. | .................. | 192/64 |
| 4,240,303 A * | 12/1980 | Mosley | ......................... | 474/144 |
| 4,278,265 A * | 7/1981 | Nagano | ....................... | 280/160.1 |
| 4,475,894 A * | 10/1984 | Sugino | ......................... | 474/144 |
| 4,593,799 A * | 6/1986 | Ozaki | .............................. | 192/46 |
| 5,003,840 A * | 4/1991 | Hinschlager | ................. | 74/594.2 |
| 5,480,359 A * | 1/1996 | Tani | .............................. | 474/160 |
| 6,004,240 A * | 12/1999 | Tabe | ............................. | 475/259 |

(Continued)

FOREIGN PATENT DOCUMENTS

| | | |
|---|---|---|
| CN | 2228041 Y | 5/1996 |
| DE | 35 23 358 A1 | 10/1986 |

(Continued)

OTHER PUBLICATIONS

Shimano Inc.; "2004 Bicycle Components Trade Sales & Support Manual"; CS-LG60.

*Primary Examiner* — Henry Liu
(74) *Attorney, Agent, or Firm* — Global IP Counselors (57) ABSTRACT

A bicycle sprocket assembly includes a sprocket element and a chain protector. The sprocket element has a plurality of teeth disposed on an outer periphery about a center rotation axis and at least one first attachment element. The chain protector includes a protecting portion and an attachment portion disposed radially inwardly of the protecting portion. The attachment portion has at least one second attachment element that mates with the first attachment element in response to relative rotational movement between the sprocket element and the chain protector.

16 Claims, 9 Drawing Sheets

(56) References Cited

U.S. PATENT DOCUMENTS

| | | | |
|---|---|---|---|
| 6,380,731 B1 * | 4/2002 | Nishimoto | 324/173 |
| 6,443,865 B1 * | 9/2002 | Yamanaka | 474/144 |
| 6,450,909 B1 * | 9/2002 | Yamanaka | 474/160 |
| 6,475,110 B1 * | 11/2002 | Yamanaka | 474/152 |

FOREIGN PATENT DOCUMENTS

| | | |
|---|---|---|
| DE | 296 01 861 U1 | 4/1996 |
| EP | 1 288 119 A2 | 3/2003 |
| GB | 573423 | 11/1943 |
| GB | 1555532 | 11/1979 |
| GB | 2 171 474 A | 8/1986 |
| JP | 51-149548 U | 11/1976 |
| JP | 54-155251 U | 10/1979 |
| JP | 59-41916 U | 12/1984 |
| JP | 60-149484 U | 10/1985 |
| JP | 2563661 U | 11/1997 |
| JP | 2606244 U | 8/2000 |

* cited by examiner

BICYCLE SPROCKET ASSEMBLY WITH CHAIN PROTECTOR

BACKGROUND OF THE INVENTION

1. Field of the Invention

This invention generally relates to a bicycle sprocket assembly. More specifically, the present invention relates to a bicycle sprocket assembly having a bicycle chain protector attached to a sprocket element in response to relative rotational movement between the chain protector and the sprocket element.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One area that has been extensively redesigned over the years is the bicycle drive train. Specifically, manufacturers of bicycle components have been continually improving shifting performance of the various shifting components such as shifters, derailleurs, chain and sprockets.

One particular component of the drive train that has been extensively redesigned in the past years is the rear sprocket assembly. Specifically, rear sprocket assemblies have been designed with improved sprockets to provide smoother shifting. Also, rear sprocket assemblies have been provided with more rear sprockets (e.g., 7, 8, 9 or even 10 rear sprockets) to provide a larger selection of different gear ratios for the bicycle transmission. In any event, rear sprocket assemblies have also been provided with chain/spoke protectors adjacent the largest rear sprocket to prevent the chain from falling off the largest sprocket into the spokes.

Typically, the prior chain/spoke protectors are either attached to the rear hub or attached to the largest rear sprocket using an axial snap fit. One example of such a rear sprocket assembly using an axial snap fitted protector is model CS-LG60 manufactured and sold by Shimano, Inc. While these prior spoke/chain protectors generally work well, there has been a demand for a more durable spoke/chain protector that is also relatively lightweight, and relatively simple and inexpensive to manufacture and assemble.

In view of the above, it will be apparent to those skilled in the art from this disclosure that there exists a need for an improved bicycle sprocket assembly. This invention addresses this need in the art as well as other needs, which will become apparent to those skilled in the art from this disclosure.

SUMMARY OF THE INVENTION

One object of the present invention is to provide a bicycle sprocket assembly with a chain protector, which prevents the chain from falling off of a sprocket into the spokes and which protects the chain from external objects such as wood or rocks.

Another object of the present invention is to provide a bicycle sprocket assembly with a chain protector, which is relatively rigid, yet is relatively light weight.

Another object of the present invention is to provide a bicycle sprocket assembly with a chain protector, which is relatively simple and inexpensive to manufacture and assemble.

The foregoing objects can basically be attained by providing a bicycle sprocket assembly, which includes a sprocket element and a chain protector. The sprocket element has a plurality of teeth disposed on an outer periphery about a center rotation axis and at least one first attachment element. The chain protector includes a protecting portion and an attachment portion disposed radially inwardly of the protecting portion. The attachment portion has at least one second attachment element that mates with the first attachment element in response to relative rotational movement between the sprocket element and the chain protector.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

An embodiment of the present invention will now be explained with reference to the drawings. It will be apparent to those skilled in the art from this disclosure that the following descriptions of the embodiment of the present invention are provided for illustration only and not for the purpose of limiting the invention as defined by the appended claims and their equivalents.

Figure 1:
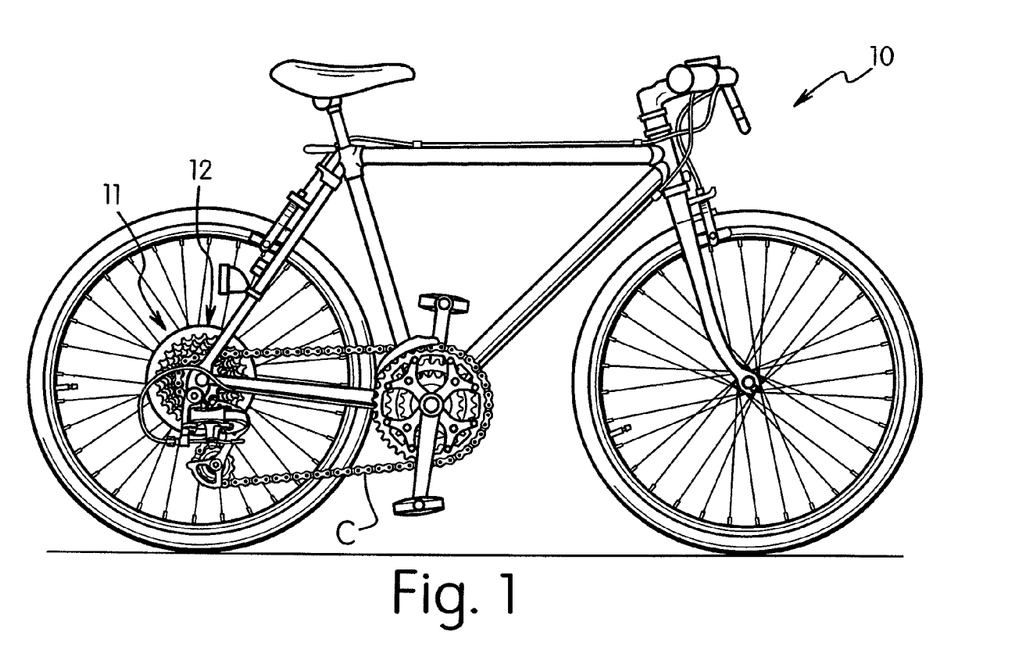
FIG. 1 is a side elevational view of a bicycle equipped with a rear sprocket assembly having a chain protector in accordance with the present invention.

Referring initially to FIG. 1, a bicycle 10 having a rear hub 11 with a rear multi-stage sprocket assembly 12 attached thereto is illustrated in accordance with the present invention. The rear sprocket assembly 12 has a chain protector 22 in accordance with the present invention. Specifically, the multi-stage sprocket assembly 12 preferably includes a plurality (e.g., six) rear sprockets $S_1$-$S_6$ non-rotatably mounted to a freewheel 13 of the rear hub 11. The chain protector 22 is mounted to attachment elements disposed between the largest rear sprocket $S_1$ and the second largest rear sprocket $S_2$ using a rotational movement about a center rotation axis X of the rear hub 12 and the rear sprocket assembly 12 in accordance with the present invention.

The bicycle 10 is conventional, except for the rear sprocket assembly 12 having the bicycle chain protector 22 attached thereto in accordance with the present invention. Accordingly, the bicycle 10 will not be explained and/or illustrated in detail herein, except as related to the rear sprocket assembly 12 and the chain protector 22 in accordance with the present invention. However, it will be apparent to those skilled in the bicycle art from this disclosure that the present invention can be utilized on a variety of different bicycle types as well as utilized in conjunction with a variety of different bicycle components, as needed and/or desired.

Figure 2:
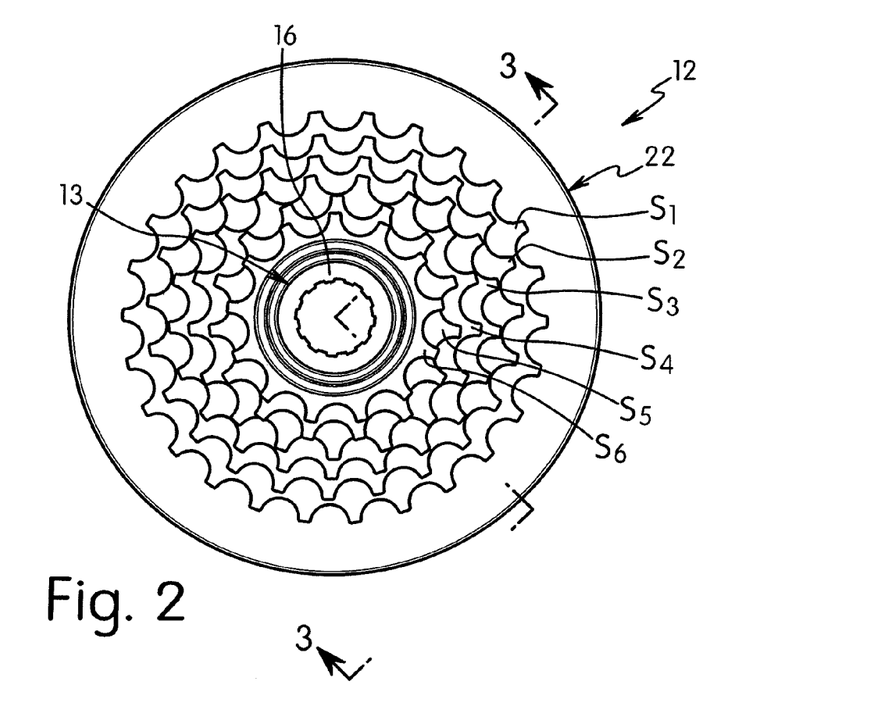
FIG. 2 is an enlarged, outside (outer axial) elevational view of the rear sprocket assembly having the chain protector illustrated in FIG. 1.
Figure 3:
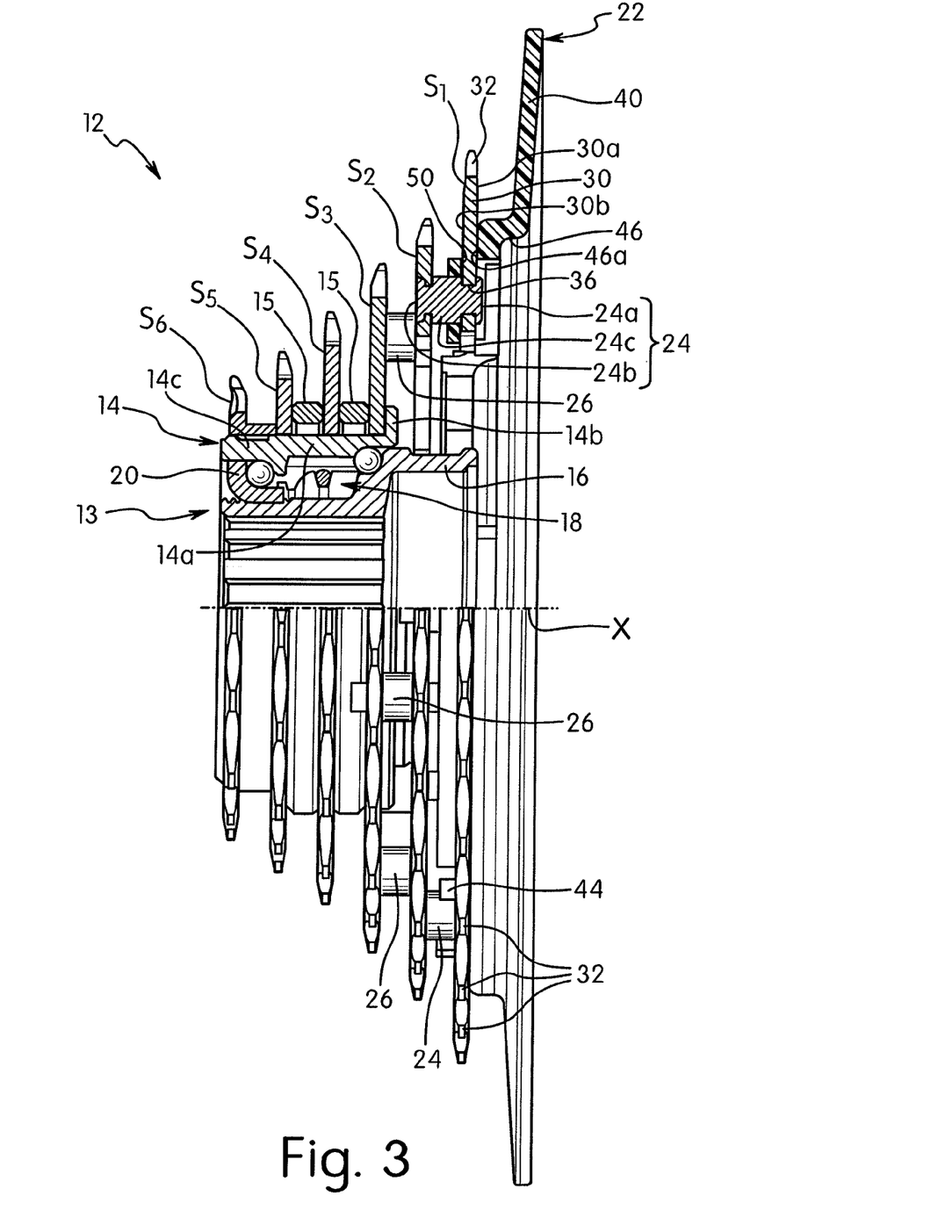
FIG. 3 is a further enlarged, transverse, partial cross-sectional view of the rear sprocket assembly having the chain protector illustrated in FIG. 2, as viewed along section line 3-3 of FIG. 2.
Figure 4:
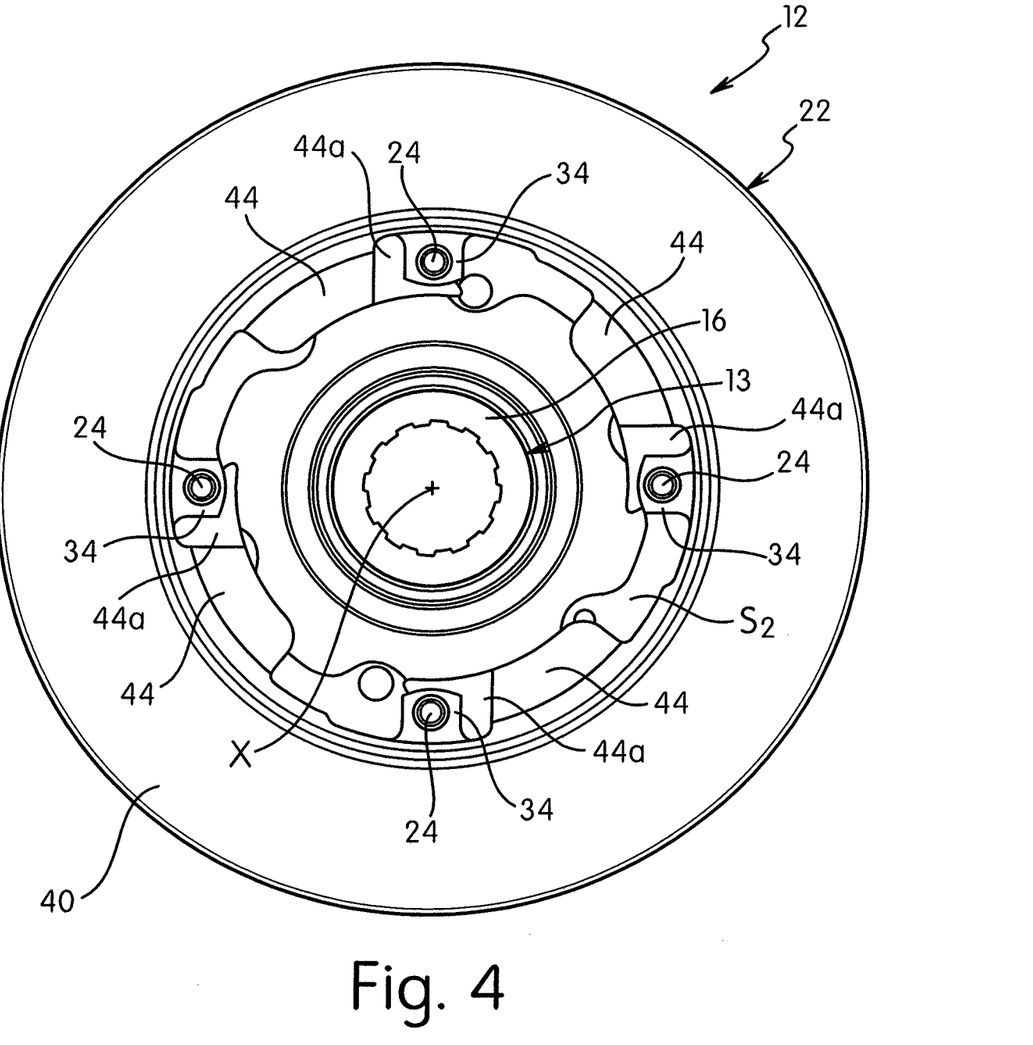
FIG. 4 is an inside (inner axial) elevational view of the rear sprocket assembly having the chain protector illustrated in FIG. 3.
Figure 5:
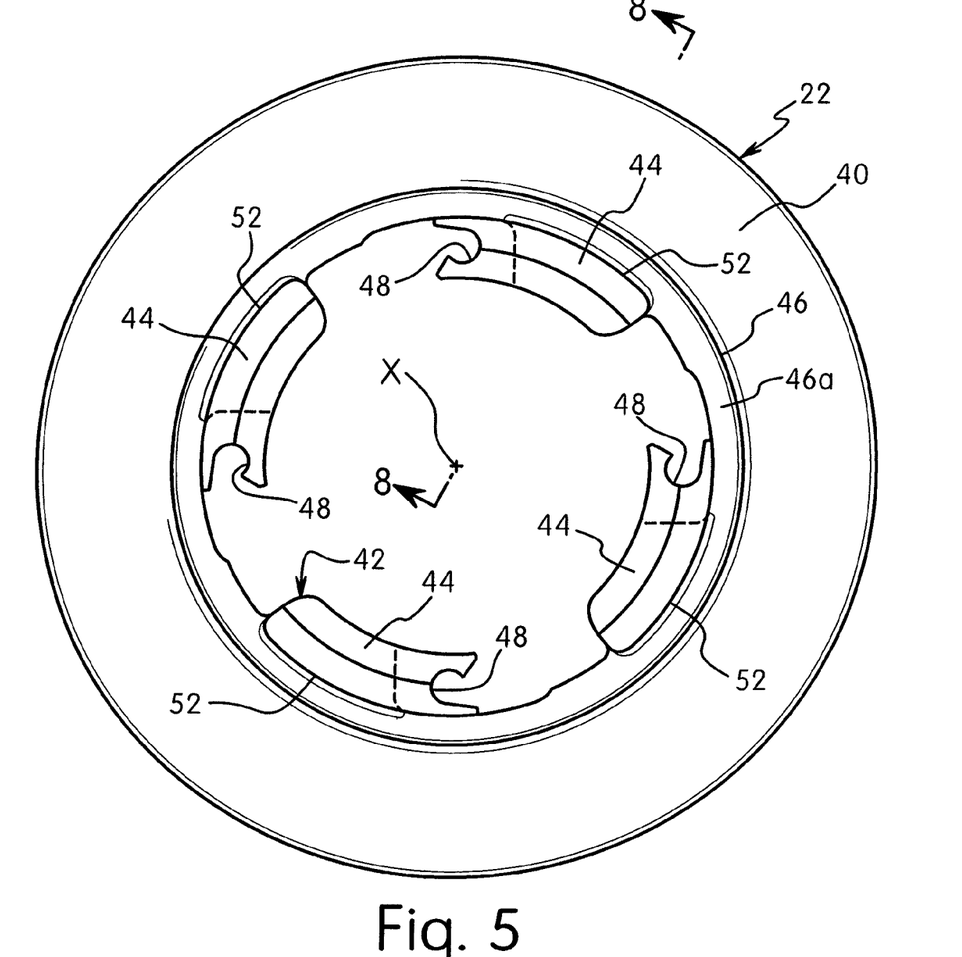
FIG. 5 is an outside (outer axial) elevational view of the chain protector illustrated in FIGS. 3-4.
Figure 6:
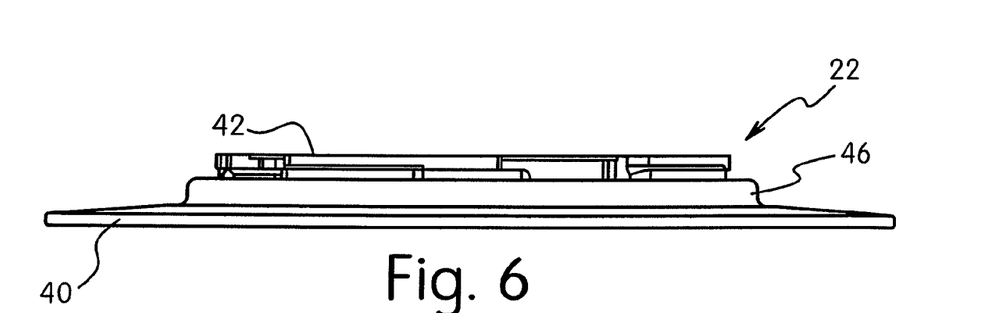
FIG. 6 is transverse, elevational view of the chain protector illustrated in FIG. 5.
Figure 7:
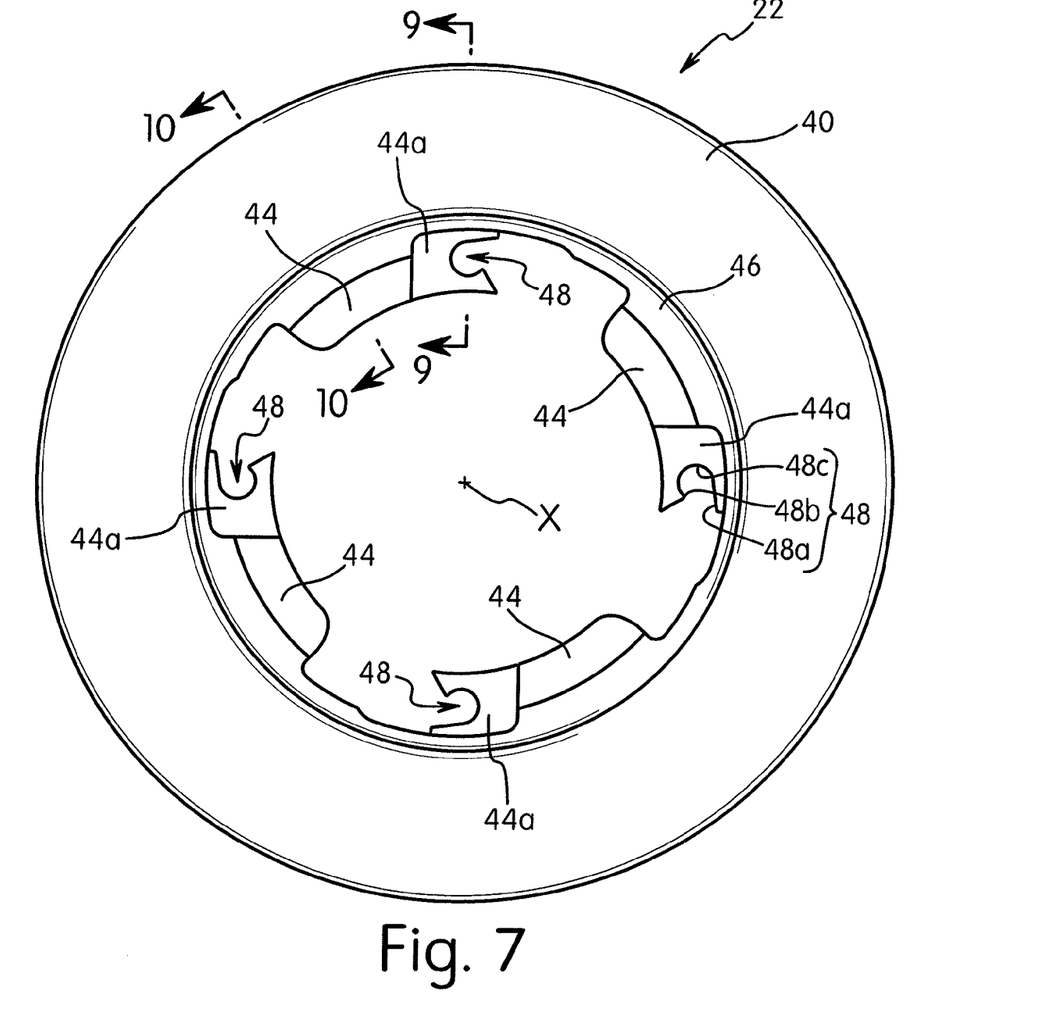
FIG. 7 is an inside (inner axial) elevational view of the chain protector illustrated in FIGS. 5-6.

Referring to FIGS. 2-4, the freewheel 13 basically includes an outer tubular member 14, an inner tubular member 16, a one-way clutch 18 and a retaining member 20. A plurality of ball bearings are disposed between the outer tubular member 14 and the inner tubular member 16 in two locations as best seen in FIG. 3. The one-way clutch 18 is disposed between the outer tubular member 14 and the inner tubular member 16 in a conventional manner to transmit forward rotation (clockwise as viewed in FIG. 2) of the outer tubular member 14 to the inner tubular member 16, but to allow the outer tubular member 14 to rotate freely relative to the inner tubular member 16 in a rearward direction (counterclockwise as viewed in FIG. 2). The inner tubular member 16 is preferably a step-shaped member with a splined internal surface configured to engage a mating surface of the rear hub shell (not shown). The retaining member 20 is threaded onto the inner tubular member 16 to retain the parts of the assembled freewheel 13 together as a unit. The freewheel 13 operates in a conventional manner. Thus, the freewheel 13 will not be discussed and/or illustrated in further detail herein, except as related to the sprocket assembly 12 of the present invention.

The sprockets $S_1$-$S_6$ are non-rotatably mounted on the outer tubular member 14. Specifically, the outer tubular member 14 includes a splined section 14a, an abutment shoulder 14b and a threaded section 14c. The sprockets $S_3$-$S_5$ are slideably, non-rotatably received on the splined section 14a with a pair of spacers 15 received therebetween. The sprocket $S_3$ contacts the abutment shoulder 14b. The sprocket $S_6$ is threaded onto the threaded section 14c to retain the sprockets $S_3$-$S_5$ on the splined section 14a. The sprocket $S_6$ has an integral spacer portion. The sprocket $S_1$ is attached to the sprocket $S_2$ using a plurality of first attachment members 24. The first attachment members 24 are preferably deformable metallic pins such as rivets. The sprocket $S_2$ is attached to the sprocket $S_3$ using a plurality of second attachment members 26. The second attachment members 26 are also preferably deformable metallic pins such as rivets. Thus, all of the sprockets $S_1$-$S_6$ are non-rotatably attached on the outer tubular member 14.

Each of the first attachment members (rivets) 24 has a first attachment end 24a attached to the sprocket $S_1$, a second attachment end 24b attached to the sprocket $S_2$ and a spacing portion 24c extending axially between opposing axially facing surfaces of the sprockets $S_1$ and $S_2$. Similarly, each of the second attachment members (rivets) 26 has a second attachment end (not shown) attached to the sprocket $S_2$, a third attachment end (not shown) attached to the sprocket $S_3$ and a spacing portion extending axially between opposing axially facing surfaces of the sprockets $S_2$ and $S_3$. The first attachment elements (rivets) 24 are arranged and configured to mate with the chain protector 22 in response to relative rotational movement between the chain protector 22 and the sprocket $S_1$ to non-rotatably attach the chain protector 22 and the sprocket $S_1$ together, as explained below.

Referring to FIGS. 2 and 3, the rear sprocket assembly 12 will now be explained in more detail. As mentioned above, in the illustrated embodiment, the rear sprocket assembly 12 is a six-stage sprocket assembly with the six sprockets $S_1$-$S_6$ mounted on the freewheel 13 of the rear hub 11 such that the sprockets $S_1$-$S_6$ rotate together about the center rotation axis X. However, it will be apparent to those skilled in the bicycle art from this disclosure that the rear sprocket assembly 12 can have more or fewer sprockets if needed and/or desired.

The sprockets of $S_1$-$S_6$ of the multi-stage sprocket assembly 12 are configured and arranged to engage with a conventional drive chain C in a conventional manner as seen in FIG. 1. Thus, when the sprockets $S_1$-$S_6$ rotate together in a forward rotational direction (e.g., in a clockwise direction as viewed in FIG. 2) due to the rider pedaling in a forward (clockwise) direction, the bicycle 10 is propelled in a forward direction as seen in FIG. 1. The chain C can be shifted between the sprockets $S_1$-$S_6$ by a rear derailleur in a conventional manner when the rider is pedaling in a forward direction.

Referring now to FIGS. 2-4 and 11, the sprocket $S_1$ will now be explained in more detail. The sprocket $S_1$ is an annular plate shaped member. The sprocket $S_1$ basically includes an annular main body portion 30, a plurality of first teeth 32 and a plurality attachment flanges 34. The first teeth 32 are disposed about an outer periphery of the annular main body 30 about the center rotation axis X. The attachment flanges 34 extend radially inwardly from the annular main body portion 30. In the illustrated embodiment, four of the attachment flanges 34 are provided in a circumferentially equally spaced arrangement. Each of the attachment flanges 34 has a through hole 36 formed therein that receives the first attachment end 24a of one of the attachment members 24. The attachment members 24 and the attachment flanges 34 constitute parts of (first) attachment elements of the sprocket $S_1$.

The sprocket $S_1$ is preferably an annular plate shaped member as mentioned above. Thus, the sprocket $S_1$ has first and second annular axially facing side surface 30a and 30b. The surface 30a faces away from the sprocket $S_2$, while the surface 30b faces toward the sprocket $S_2$. The spacing portions 24c of the attachment members 24 extend axially from the axially facing surface 30b to a similar, opposed surface of the sprocket $S_2$. The axial length of the spacing portions 24c are set such that the Sprockets $S_1$ and $S_2$ are spaced from each other at a prescribed interval for smooth shifting of the chain C therebetween. The attachment members 26 space the sprockets $S_2$ and $S_3$ from each other in a similar manner. The sprocket $S_1$ is preferably constructed using conventional manufacturing techniques such as stamping, punching, casting and/or machining in a conventional manner. The annular main body portion 30, the plurality of first teeth 32 and the plurality attachment flanges 34 are preferably integrally formed together as a one-piece, unitary member.

Accordingly, in the embodiment, the sprocket $S_1$ constitutes a one-piece, sprocket element in accordance with the present invention. However, it will be apparent to those skilled in the bicycle art from this disclosure that the sprocket $S_1$ could be made up of a plurality of sprocket elements (e.g., two or more arc-shaped sprocket elements with each having teeth about their outer peripheries and at least one attachment flange 34). In this embodiment, when the first attachment members 24 are attached to the sprocket $S_1$ (i.e., in order to attach the sprocket $S_1$ to the sprocket $S_2$) each attachment flange 34 and first attachment member 24 attached thereto constitute parts of a first attachment element of the sprocket $S_1$ in accordance with the present invention. Thus, the sprocket $S_1$ preferably includes a plurality of such attachment elements that are circumferentially spaced from each other. The spacing portions 24c of the first attachment members (rivets) 24 constitute axially extending projecting portions of the attachment elements of the sprocket $S_1$, which extend axially from the sprocket $S_1$.

The sprockets $S_2$ and $S_3$ have configurations similar to the sprocket $S_1$. Specifically, the sprockets $S_2$ and $S_3$ have a plurality of chain engagement teeth similar to the sprocket $S_1$, but have respectively smaller diameters (fewer teeth), as understood from FIGS. 2-3. The sprocket $S_2$ has a plurality of though openings, which have the second attachment ends 24b of the first attachment members 24 attached therein, and a plurality of additional attachment openings, which have the second attachment ends (not shown) of the second attachment members 26 attached therein. The third attachment ends (not shown) of the second attachment members 26 are attached in similar holes of the sprocket $S_3$. The precise construction of the sprockets $S_2$ and $S_3$ is not critical to the manner in which the chain protector 22 is attached, and thus, will not be explained and/or illustrated in further detail herein.

Referring now to FIGS. 2-10, the chain protector 22 will now be explained in more detail. The chain protector 22 basically includes a protecting portion 40 and an attachment portion 42 disposed radially inwardly of the protecting portion 40. The protecting portion 40 has an annular conical disc-shaped configuration, as best understood from FIGS. 3-8. The attachment portion 42 includes a plurality of attachment sections 44 configured and arranged to be attached to the first attachment members 24 and the attachment flanges 34. In the illustrated embodiment, four of the attachment sections 44 are provided in a circumferentially equally spaced arrangement so as to mate with the attachment members 24 extending from the attachment flanges 34.

Figure 8:
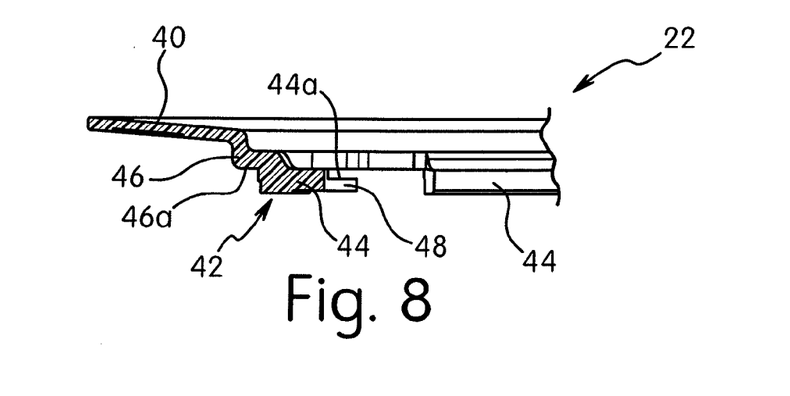
FIG. 8 is a cross-sectional view of the chain protector illustrated in FIGS. 5-7, as seen along section line 8-8 of FIG. 5.
Figure 9:
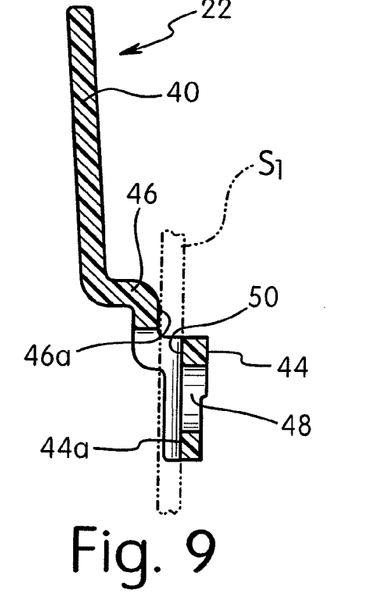
FIG. 9 is an enlarged, partial cross-sectional view of the chain protector illustrated in FIGS. 5-8, as seen along section line 9-9 of FIG. 7, with the largest rear sprocket shown in phantom lines for the purpose of illustration.
Figure 10:
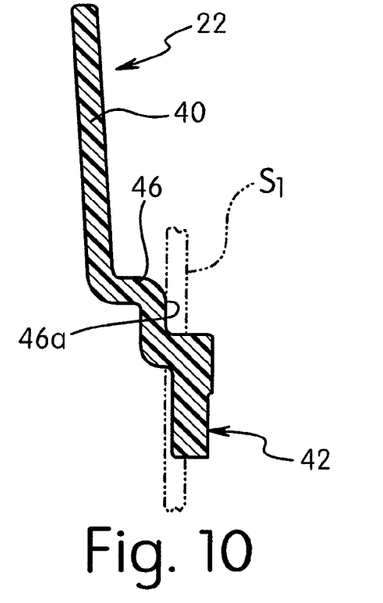
FIG. 10 is an enlarged, partial cross-sectional view of the chain protector illustrated in FIGS. 5-8, as seen along section line 10-10 of FIG. 7, with the largest rear sprocket shown in phantom lines for the purpose of illustration.
Figure 11:
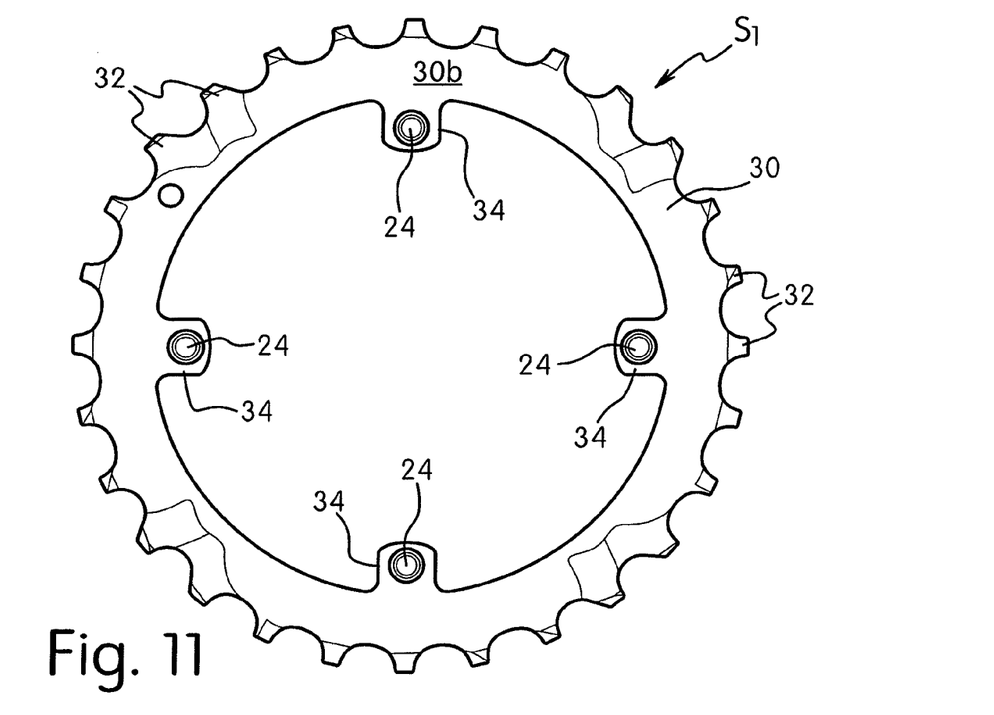
FIG. 11 is an outside (outer axial) elevational view of the low (largest) rear sprocket of the rear sprocket assembly illustrated in FIGS. 2-4, with the low (largest) sprocket removed from the remaining sprockets and with a plurality of rivets extending therefrom.
Figure 12:
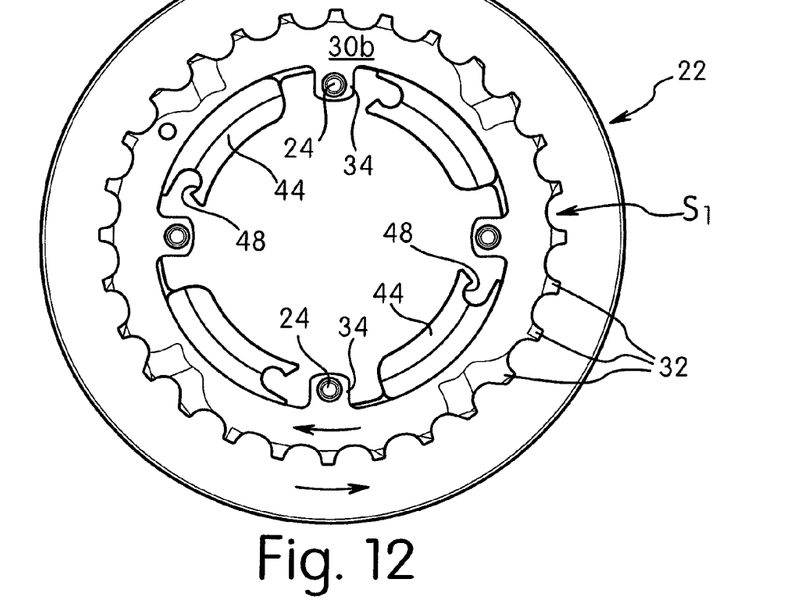
FIG. 12 is an outside (outer axial) elevational view of the low (largest) rear sprocket and the chain protector of the rear sprocket assembly illustrated in FIGS. 2-4 and 11, prior to attaching the chain protector.
Figure 13:
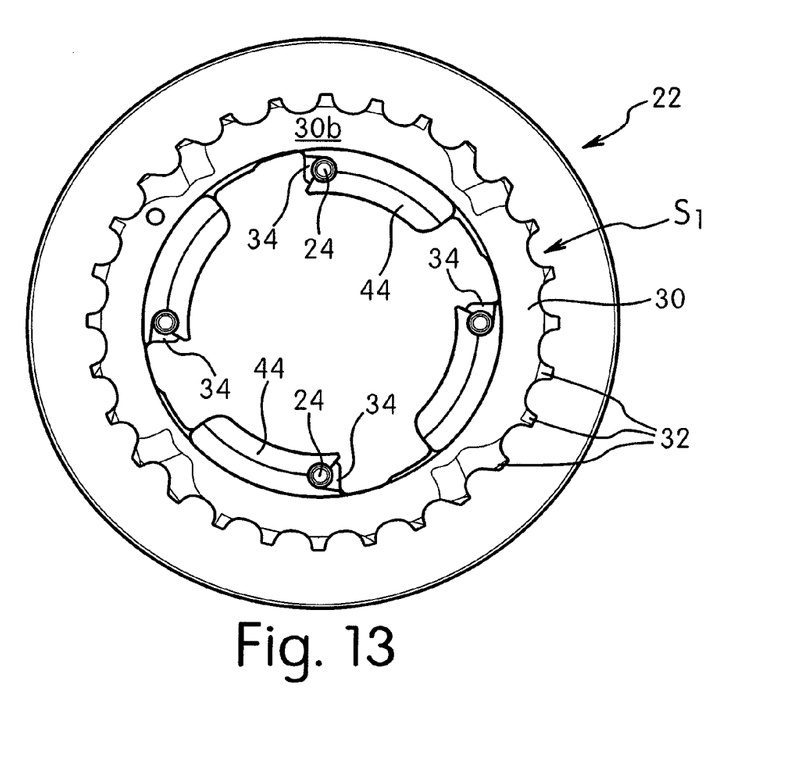
FIG. 13 is an outside (outer axial) elevational view of the low (largest) rear sprocket and the chain protector of the rear sprocket assembly illustrated in FIGS. 2-4 and 11, after attaching the chain protector.
Figure 14:
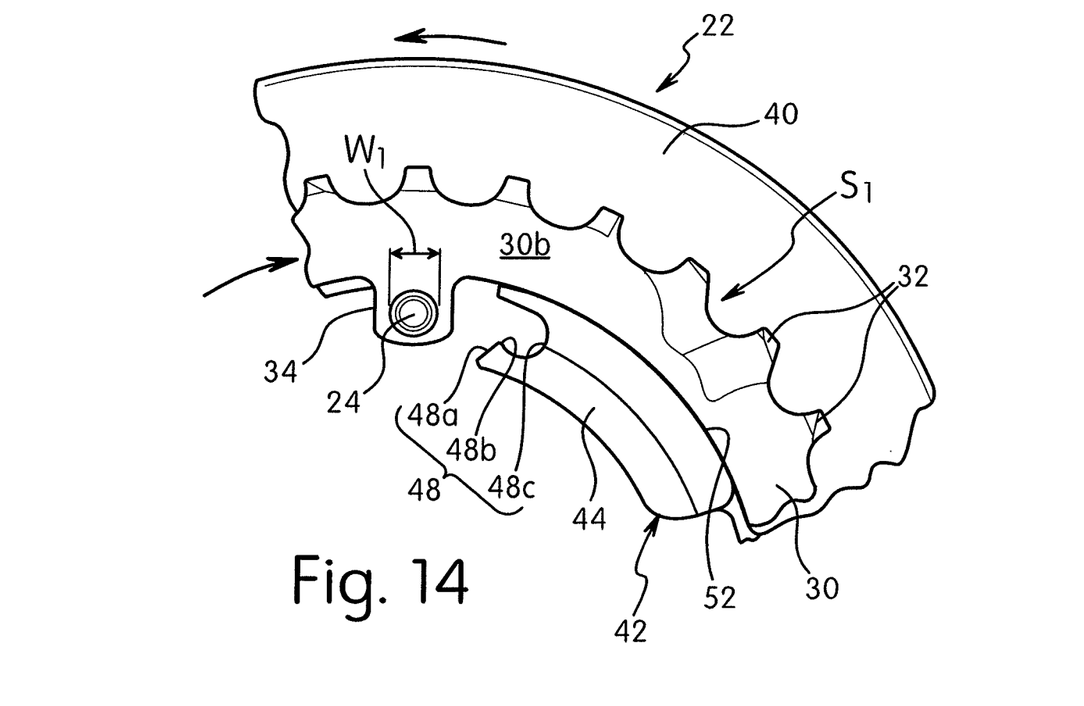
FIG. 14 is a further enlarged view of portions of the low (largest) rear sprocket and the chain protector illustrated in FIG. 10, prior to attaching the chain protector to the low (largest) rear sprocket.
Figure 15:
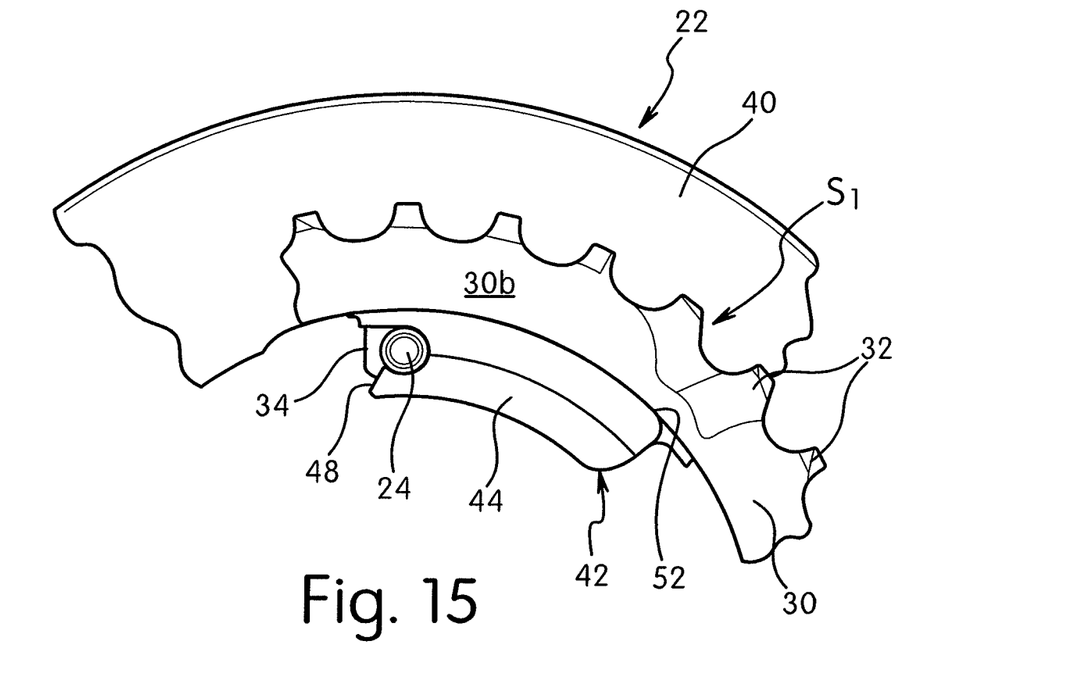
FIG. 15 is a further enlarged view of portions of the low (largest) rear sprocket and the chain protector illustrated in FIG. 11, after attaching the chain protector to the low (largest) rear sprocket.

A connecting portion 46 extends axially between the protecting portion 40 and the attachment portion 42 in a stepped arrangement, as best understood from FIG. 8. Thus, the attachment sections 44 are preferably axially offset from the protecting portion 40. The connecting portion 46 has a continuous annular configuration with an annular surface 46a that contacts the axially facing surface 30a of the sprocket $S_1$ radially inwardly of the first teeth 32, as best seen in FIGS. 3, 5, 6 and 8. Thus, the protecting portion 40 preferably radially overlaps with the first teeth 32 of the sprocket $S_1$ as viewed along the center rotation axis X.

Preferably, the protecting portion 40, the attachment portion 42 having the attachment sections 44, and the connecting portion 46 are integrally formed together as a one-piece, unitary member from a light weight, rigid material such as a plastic material using conventional manufacturing techniques such as casting or the like. However, it will be apparent to those skilled in the bicycle art from this disclosure that the chain protector 22 and/or the protecting portion 40, the attachment portion 42 having the attachment sections 44, and the connecting portion 46 can be constructed of several different parts and/or materials, if needed and/or desired.

Each of the attachment sections 44 includes a slot 48 having an insertion portion 48a, a (rivet) retaining portion 48b and a holding portion 48c. Each insertion portion 48a is wider than a width $W_1$ of the spacing portions 24c. The insertion portions 48a are configured and arranged to guide the spacing portions 24c toward the holding portions 48c of the slots 48. The retaining portions 48b of the slots 48 each have a width that is preferably smaller than the width $W_1$ of the spacing portions 24c of the attachment members 24. Specifically, each retaining portion 48b preferably has projection or tooth that is deformable so as to receive the spacing portion 24c in a snap-fit type connection into the holding portion 48c. The holding portions 48c are where the spacing portions 24c of the respective attachment members 24 are seated in a fully installed position, i.e., after moving circumferentially past the retaining portions 48b. The size and shape of the holding portion 48c corresponds to the size and shape of the spacing portions 24c.

The slots 48 extend in a circumferential direction about the center rotation axis X. Specifically, the insertion portions 48a are circumferentially disposed relative to the retaining portions 48b, and the retaining portions 48b are circumferentially disposed relative to the holding portions 48c. Thus, the chain protector 22 is preferably attached to the sprocket $S_1$ when the chain protector 22 and the sprocket $S_1$ rotated relative to each other via a bayonet-type mount. Preferably, the sprocket $S_1$ rotates in a forward rotational direction relative to the chain protector 22 during attachment. In other words, the chain protector rotates in a reverse rotational direction relative to the sprocket $S_1$ during attachment, as best understood from FIGS. 4 and 12-17.

Each of the attachment sections 44 has an axially facing contact surface 44a that is axially offset from the annular surface 46a to receive the sprocket $S_1$ axially therebetween. The slots 48 extend perpendicularly from to the axially facing contact surfaces 44a. In other words, the slots 48 have center axes that are preferably parallel to the center rotation axis. A circumferential slot or cutout 50 (viewable in a radial direction) extends radially outwardly from the contact surface 44a in order to receive one of the attachment flanges 34 of the sprocket $S_1$ therein when the chain protector 22 and the sprocket $S_1$ are attached together. The slots 50 are sized and shaped to correspond in size and shape to the portions of the attachment flanges 34 received therein, as best understood from FIGS. 3, 4, 9 and 10. Each of the attachment sections 44 further includes an arc-shaped support surface 52 extending from the termination point its respective slot 50. The arc-shaped support surfaces 52 preferably contact an inner peripheral edge of the sprocket $S_1$ to provide radial support between the chain protector 22 and the sprocket $S_1$.

Each attachment section 44 having one of the axially facing surfaces 44a, one of the slots 48 and one of the slots 50 constitutes a second attachment element of the chain protector 22. Thus, the chain protector 22 preferably has a plurality of such second attachment elements arranged in a circumferentially spaced arrangement. Due to the above configuration, the chain protector 22 is preferably attached to the sprocket $S_1$ with a bayonet type mount. In other words, the first and second attachment elements of the sprocket $S_1$ and the chain protector 22, respectively, attach to each other via non-threaded connections. Thus, the sprocket $S_1$ and the chain protector 22 are preferably attached to each other in a non-threaded manner.

Figure 16:
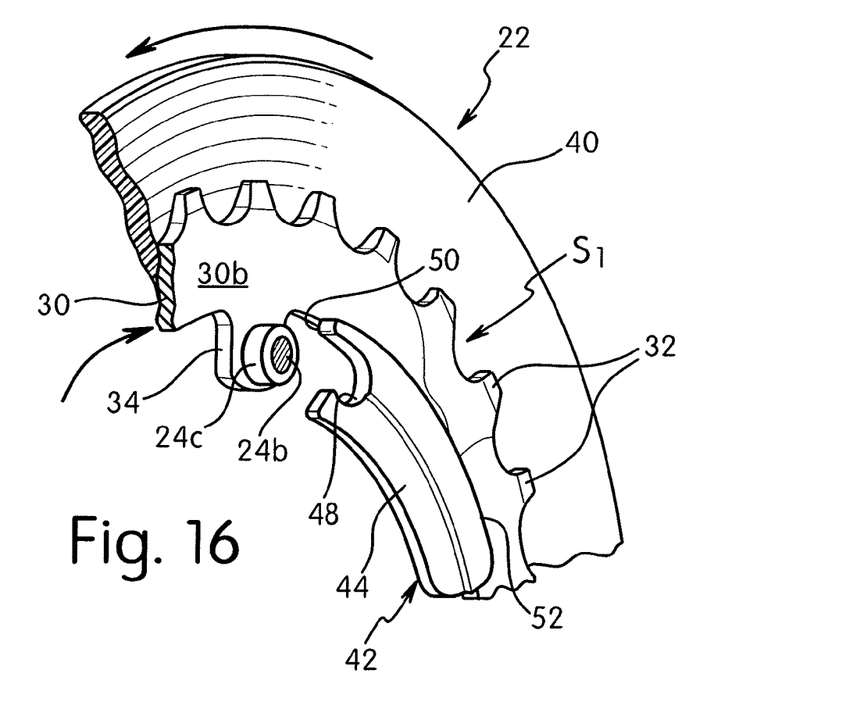
FIG. 16 is a partial perspective view of the portions of the sprocket assembly illustrated in FIG. 14.
Figure 17:
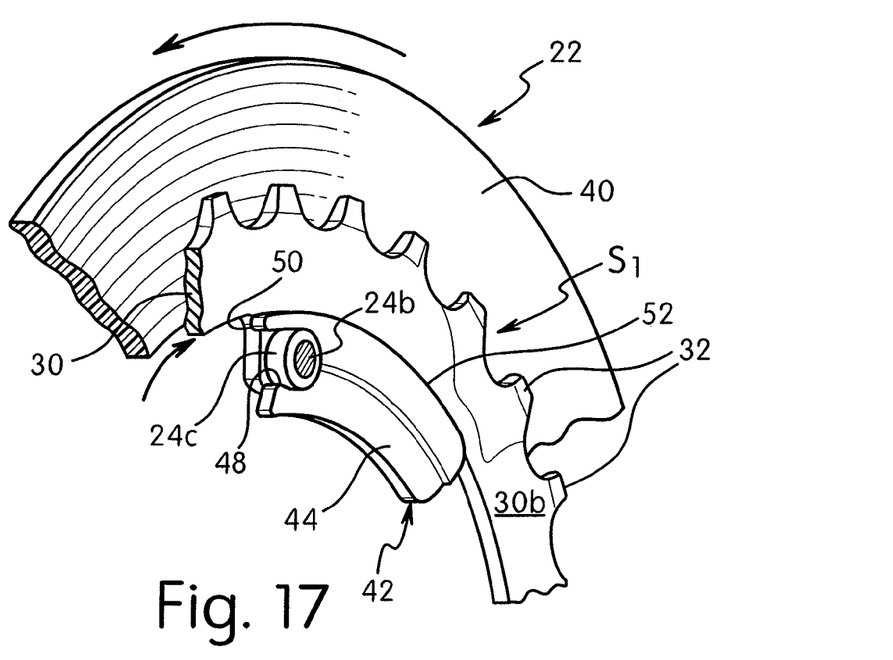
FIG. 17 is a partial perspective view of the portions of the sprocket assembly illustrated in FIG. 15.

Referring now to FIGS. 9-17, attachment of the chain protector 22 to the sprocket $S_1$ will now be explained. The freewheel 13 is preferably assembled as a unit in a conventional manner. The sprockets $S_1$-$S_6$ are non-rotatably mounted on the outer tubular member 14, as mentioned above. The chain protector is attached to the sprocket $S_1$. Specifically, the attachment flanges 34 are received in the slots 50 of the attachment sections 44, and the spacing portions 24c of the attachment members 24 are received in the slots 48 when the sprocket $S_1$ rotates in a forward direction relative to the chain protector, as seen in FIGS. 16 and 17. The chain protector 22 can be attached to the sprocket $S_1$ before or after attaching in the sprockets $S_1$-$S_6$ to the freewheel. However, the chain protector 22 is preferably attached after attaching the sprockets $S_1$ and $S_2$ together using the attachment members 24.

GENERAL INTERPRETATION OF TERMS

In understanding the scope of the present invention, the term "comprising" and its derivatives, as used herein, are intended to be open ended terms that specify the presence of the stated features, elements, components and/or steps, but do not exclude the presence of other unstated features, elements, components and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:

1. A bicycle sprocket assembly comprising:
    a sprocket element having first and second annular axially facing side surfaces on opposite sides of the sprocket element, a plurality of teeth disposed on an outer periphery about a center rotation axis and at least one first attachment element, the first attachment element extending from the sprocket element radially inwardly to a cantilevered free end and including an axially extending projecting portion that extends from one of the first and second annular axially facing side surfaces in a direction axially outward from the sprocket element such that the axially extending projecting portion extends from the cantilevered free end that is further radially inward of the sprocket element than a connecting end of the at least one first attachment element that connects the at least one first attachment element to the sprocket element; and
    a chain protector including a protecting portion, an attachment portion disposed radially inwardly of the protecting portion, and a connecting portion that connects the protecting portion and the attachment portion, the attachment portion has at least one second attachment element that mates with the first attachment element in response to relative rotational movement between the sprocket element and the chain protector, and the connecting portion includes an annular surface that contacts one of the first and second annular axially facing side surfaces opposite to the one of the first and second annular axially facing side surfaces from which the axially extending projecting portion extends.

2. The bicycle sprocket assembly according to claim 1, wherein
    the second attachment element includes a slot.

3. The bicycle sprocket assembly according to claim 2, wherein
    the slot extends in a circumferential direction about the center rotation axis such that the projecting portion mates with the slot in response to relative rotational movement between the sprocket element and the chain protector about the center rotation axis.

4. The bicycle sprocket assembly according to claim 1, wherein
    the sprocket element has a plurality of circumferentially spaced first attachment elements, and the attachment portion of the bicycle chain protector has a plurality of circumferentially spaced second attachment elements.

5. The bicycle sprocket assembly according to claim 4, wherein
    the first and second attachment elements attach via a non-threaded connection.

6. The bicycle sprocket assembly according to claim 5, wherein
    the first and second attachment elements attach via a bayonet-type mount.

7. The bicycle sprocket assembly according to claim 1, wherein
    the sprocket element is constructed of a metallic and the bicycle chain protector is constructed of a plastic material.

8. The bicycle sprocket assembly according to claim 1, wherein
    the sprocket element is disposed axially of the protecting portion of the chain protector in a direction of the center rotation axis, such that the second annular axially facing side surface of the sprocket element faces the protecting portion and the axially extending projecting portion extends from the first annular axially facing side surface in a direction away from the protecting portion.

9. The bicycle sprocket assembly according to claim 8, wherein
the second attachment element includes a slot that receives the axially extending projecting portion while a surface of the second attachment element contacts the first annular axially facing side surface.

10. The bicycle sprocket assembly according to claim 1, wherein
the first attachment element includes a first attachment end attached to the sprocket element, a second attachment end attached to a second sprocket element, and a spacing portion extending between the first annular axially facing side surface and an opposing annular axially facing side surface of the second sprocket element.

11. The bicycle sprocket assembly according to claim 1, wherein
the connecting portion includes a stepped configuration.

12. The bicycle sprocket assembly according to claim 2, wherein
the second attachment element defines the slot as including an insertion portion, a retaining portion and a holding portion, the insertion portion being configured to guide the first attachment element toward the holding portion, and the retaining portion being configured to retain the first attachment element in the holding portion.

13. The bicycle sprocket assembly according to claim 4, wherein
the plurality of circumferentially spaced first attachment elements all extend into a single opening in the sprocket element, and the plurality of circumferentially spaced second attachment elements all extend into the single opening to mate with the plurality of circumferentially spaced first attachment elements.

14. The bicycle sprocket assembly according to claim 1, wherein
the at least one second attachment element extends radially inwardly from the attachment portion to a cantilevered free end.

15. The bicycle sprocket assembly according to claim 4, wherein
each of the plurality of circumferentially spaced first attachment elements extends from the sprocket element radially inwardly to a respective cantilevered free end.

16. A bicycle sprocket assembly comprising:
a first sprocket element having a plurality of teeth disposed on an outer periphery about a center rotation axis of the bicycle sprocket assembly;
a second sprocket element having a plurality of teeth disposed on an outer periphery about the center rotation axis of the bicycle sprocket assembly;
at least one first attachment member fixedly connecting the first and second sprocket elements together, the first attachment member including an axially extending projecting portion that extends axially between the first and second sprocket elements; and
a chain protector including a protecting portion, an attachment portion disposed radially inwardly of the protecting portion, and a connecting portion that connects the protecting portion and the attachment portion, the protecting portion being disposed on a first axially facing side of the first sprocket element, the connecting portion being disposed on a second axially facing side of the first sprocket element that faces in an opposite direction from the first axially facing side, the attachment portion having at least one attachment section that mates with the axially extending projecting portion of the first attachment member in response to relative rotational movement between the first sprocket element and the chain protector.

* * * * *